(12) United States Patent
Kim

(10) Patent No.: US 7,692,719 B2
(45) Date of Patent: Apr. 6, 2010

(54) CCTV CAMERA DEVICE WITH VARI-FOCAL LENS OPERABLE FROM OUTSIDE

(75) Inventor: Gyu-suk Kim, Bucheon-si (KR)

(73) Assignee: Xtron I&T Co., Ltd., Bucheon-si, Gyounggi-do (KR)

( * ) Notice: Subject to any disclaimer, the term of this patent is extended or adjusted under 35 U.S.C. 154(b) by 406 days.

(21) Appl. No.: 11/883,339

(22) PCT Filed: Jan. 31, 2006

(86) PCT No.: PCT/KR2006/000333
§ 371 (c)(1),
(2), (4) Date: Jul. 30, 2007

(87) PCT Pub. No.: WO2006/080825
PCT Pub. Date: Aug. 3, 2006

(65) Prior Publication Data
US 2008/0143830 A1    Jun. 19, 2008

(30) Foreign Application Priority Data
Jan. 31, 2005    (KR)    .................. 20-2005-0002789 U

(51) Int. Cl.
*H04N 5/225* (2006.01)
*H04N 7/18* (2006.01)
*G03B 17/00* (2006.01)

(52) U.S. Cl. .................. 348/373; 348/374; 348/143; 396/427

(58) Field of Classification Search ................ 348/151, 348/240.99; 396/82
See application file for complete search history.

(56) References Cited

U.S. PATENT DOCUMENTS

| | | | | |
|---|---|---|---|---|
| 5,555,051 | A * | 9/1996 | Maruyama et al. | 396/144 |
| 6,375,369 | B1 * | 4/2002 | Schneider et al. | 396/427 |
| 6,867,812 | B2 * | 3/2005 | Iiizumi et al. | 348/374 |
| 6,992,722 | B2 * | 1/2006 | Jung | 348/373 |
| 7,265,789 | B2 * | 9/2007 | Takada | 348/374 |

* cited by examiner

*Primary Examiner*—Luong T Nguyen
(74) *Attorney, Agent, or Firm*—Bacon & Thomas, PLLC

(57) ABSTRACT

Disclosed is a closed circuit television that allows a focus and a focal distance of a lens located inside a camera body to be adjusted in the outside, without disassembling the camera body.

7 Claims, 3 Drawing Sheets

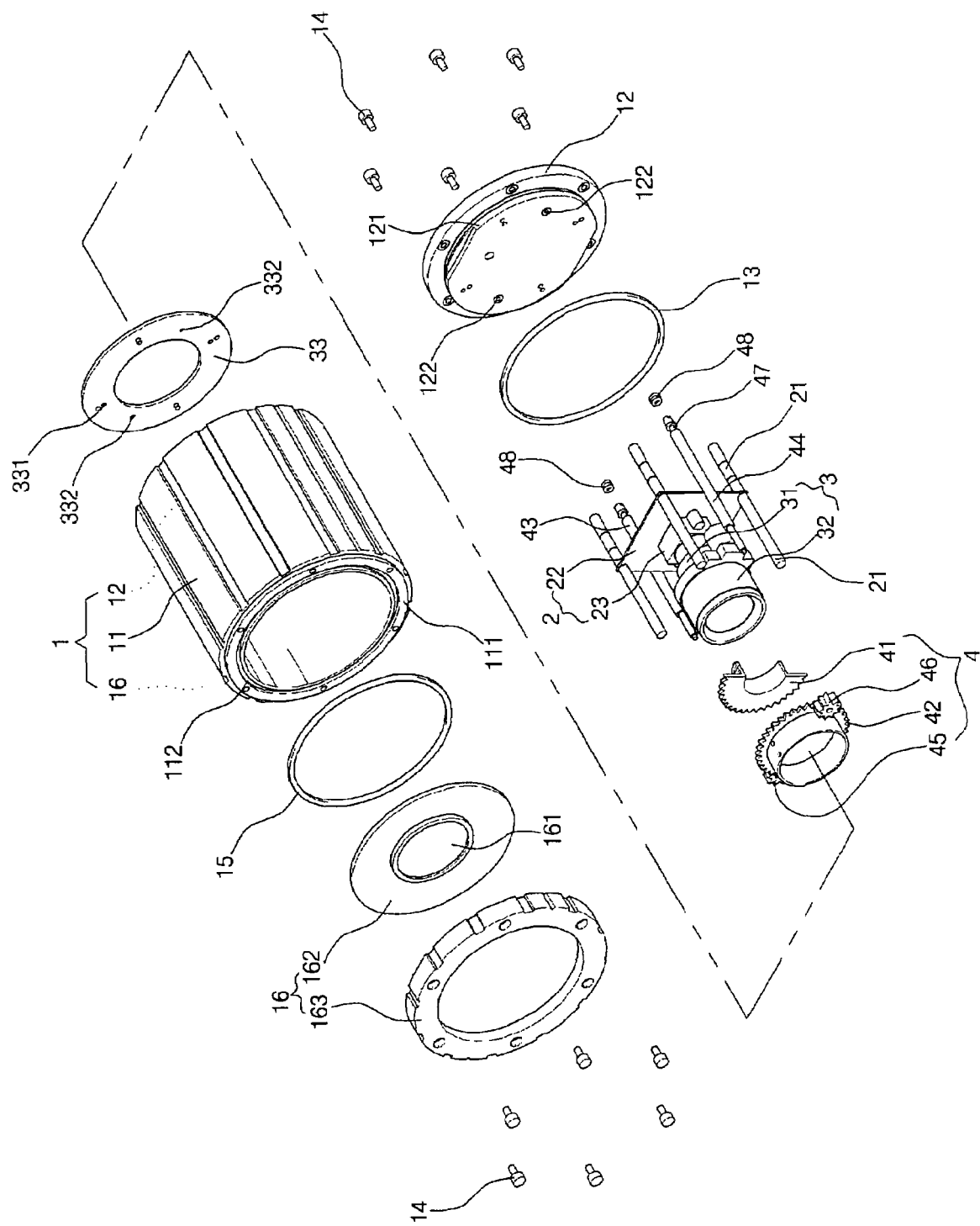
[Fig. 1]

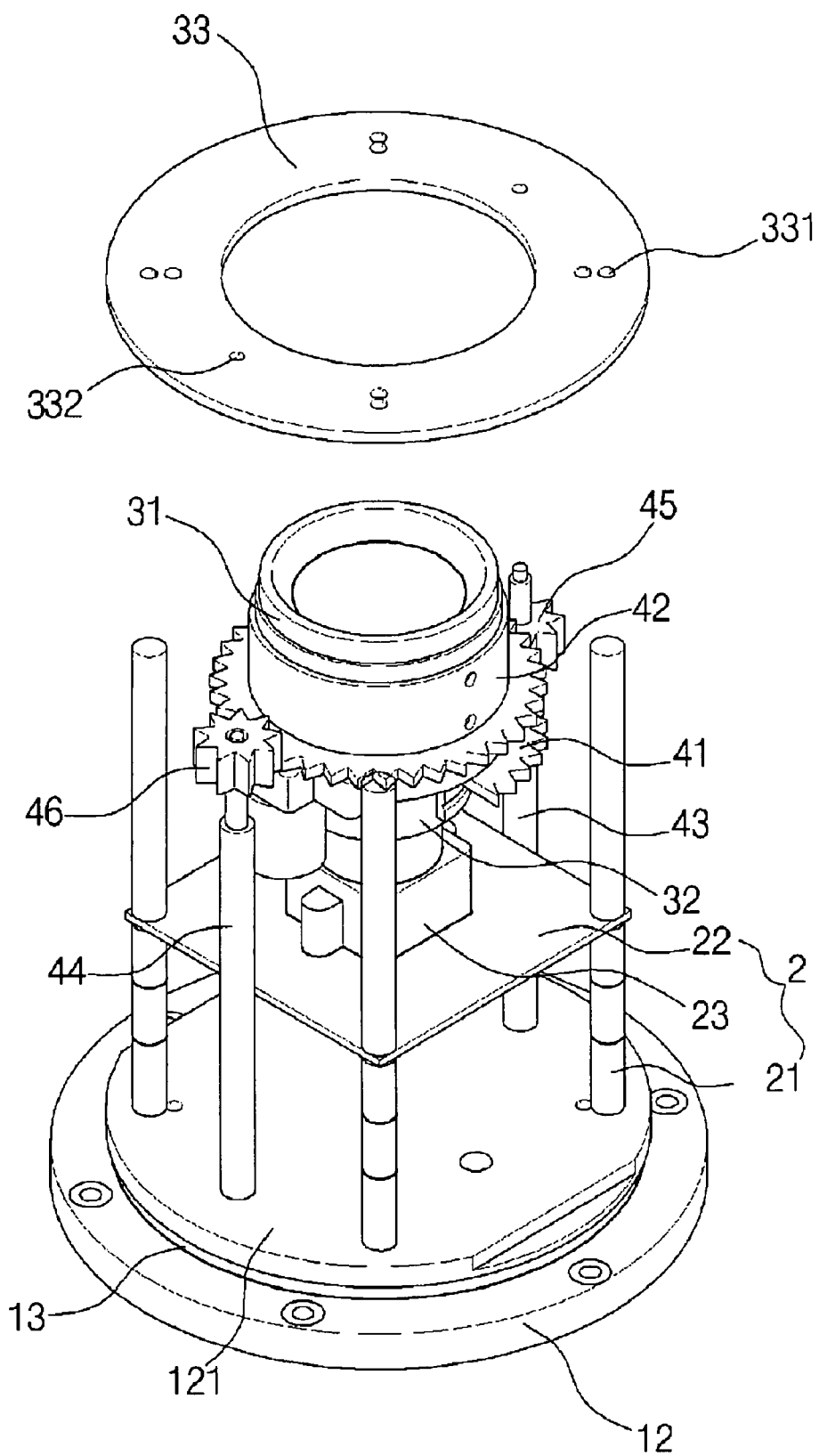
[Fig. 2]

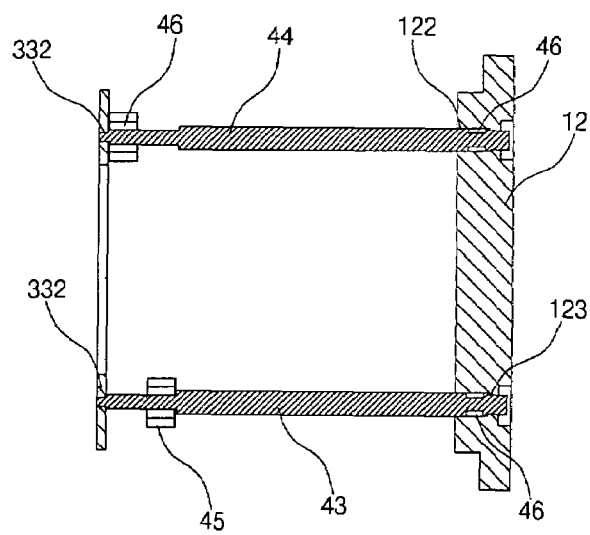
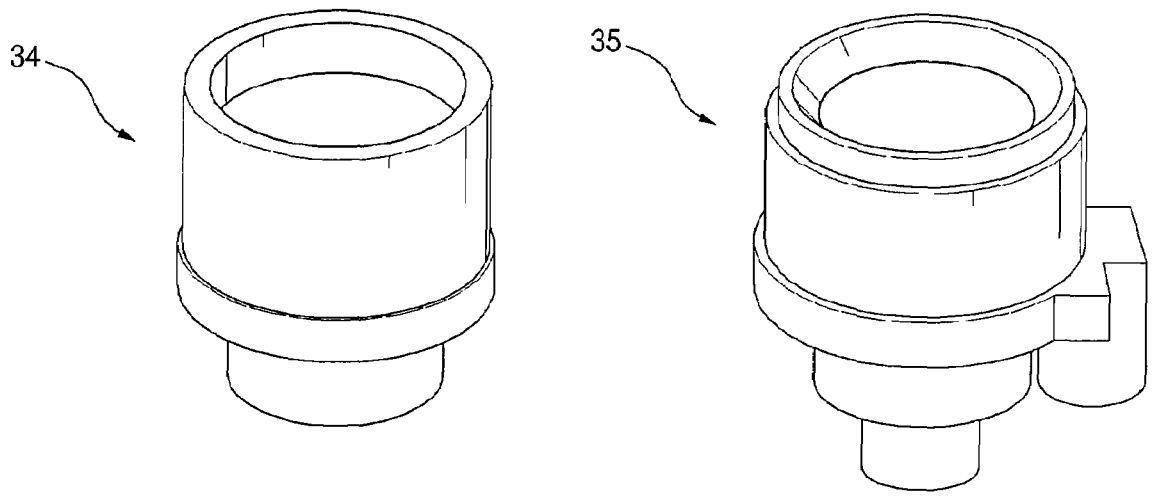

CCTV CAMERA DEVICE WITH VARI-FOCAL LENS OPERABLE FROM OUTSIDE

TECHNICAL FIELD

The present invention relates to a closed circuit television, and more particularly, to a closed circuit television that allows a focus and a focal distance of a lens located inside a camera body to be adjusted in the outside, without disassembling the camera body.

BACKGROUND ART

Generally, a closed circuit television is an apparatus that transmits images using a cable television at specific buildings or facilities, etc. and used at such places needing security as banks, and so on.

However, the conventional closed circuit television can't photograph objects located at a long distance due to its short focal distance and also makes images photographed thereby indefinite owing to being out of focus.

In order to solve such problems, there was introduced into the market a closed circuit television that can photograph objects located at a long distance by adjusting a focus and a focal distance using a high magnifying power camera incorporated in a camera body.

In such a closed circuit television, however, the camera body must be disassembled therefrom to adjust the focus and focal distance of a lens. Therefore, this entails an inconvenience of doing such disassembling and reassembling works of equipments including the body and also may cause severe damage to parts embedded therein during the disassembling and reassembling works. Additional problems are that the life span of the closed circuit television is reduced and the image quality is lowered because parts like the lens are corrupted by a contaminant such as a dust because of a worker's carelessness.

DISCLOSURE OF INVENTION

Technical Problem

The present invention has been made in order to solve the above problems, and it is, therefore, an object of the present invention to provide a closed circuit television that allows a focus and a focal distance of a lens located inside a camera body to be adjusted in the outside. Accordingly, the invention can not only solve the inconvenience problem by the disassembling and reassembling works since it doesn't need to do so but also prevent a possible damage to parts involved in the body during the disassembling and reassembling works. In addition, the invention can lengthen the life span of the closed circuit television and also keep the good quality for a long time by preventing the parts like the lens from being corrupted by a contaminant such as a dust due to a worker's carelessness.

Technical Solution

To achieve the above object, there is provided a closed circuit television comprising: closed circuit television comprising: an outer case 1 including a body 11 having a hollow shape, a front cover 16 which is detachably connected to a front of the body 11 and a rear cover 12 which is detachably connected to a rear of the body 11; a camera unit 2 including a camera module 22 disposed in an inner space of the body 11 and fixedly supported between multiple support rods 21 whose rear sections are fixed closely to a front of the rear cover 12, and a lens holder 23 installed on the camera module 22 for moving forward and backward; a lens assembly 3 including a focus adjusting unit 31 incorporating a lens and installed in a front section of the lens holder 23 for moving forward and backward by a rotational operation, and a distance adjusting unit 32 incorporating a lens and installed in a front section of the focal adjusting unit 31 for moving forward and backward by a rotational operation; a gear assembly 4 including a focus adjusting gear 41 fixedly installed on a circumferential surface of the focus adjusting unit 31, a distance adjusting gear 42 fixedly installed on a circumferential surface of the distance adjusting unit 32, and a first and a second operational gears 45 and 46 of which gear tooth is engaged with corresponding ones of each of the focus adjusting gear 41 and the distance adjusting gear 42; and a first and a second shafts 43 and 44 whose one sections are joined to the first and the second operation gears 45 and 46, respectively, and whose other sections are exposed to the outside through a shaft penetration hole 122 of the rear cover 12 to thereby enable rotational operations of the first and second shafts.

BRIEF DESCRIPTION OF THE DRAWINGS

The above objects, features and advantages of the present invention will become more apparent from the following detailed description when taken in conjunction with the accompanying drawings, in which:

FIG. 1 shows a disassembled perspective view of a closed circuit television according to an embodiment of the present invention;

FIG. 2 is a perspective view of major components of the closed circuit television according to an embodiment of the present invention;

FIG. 3 is a schematic view showing a joining structure between a first and a second shafts in the closed circuit television according to an embodiment of the present invention; and FIG. 4 is a perspective view showing verifocal lenses applicable to the closed circuit television according to an embodiment of the present invention;

BEST MODE FOR CARRYING OUT THE INVENTION

Although the present invention will now be described through preferred embodiments of a closed circuit television with reference to the accompanying drawings, the present invention is not limited to those embodiments.

As shown in FIGS. 1 to 3, the closed circuit television according to an embodiment of the present invention comprises an outer case 1 whose front and rear surfaces are sealed to be opened and closed and that has a space or room therein, a camera unit 2 which is installed inside the outer case 1, a lens assembly 3 which is embedded in the front of the camera unit 2, a gear assembly 4 installed in the lens assembly 3 for adjusting a focal distance and a focus, and a first and a second shafts 43 and 44 for operating the gear assembly 4.

The outer case 1 is provided with a cylinder body 11 of hollow shape, a front cover 16 which is detachably connected to the front of the body 11, and a rear cover 12 which is detachably connected to the rear of the body 11.

Specifically, the front cover 16 is composed of a disk-shaped protection cover 162 having a lens protection material 161 prepared at its center, and a ring-shaped fixation cap 163 which is joined to the front of the body 11 by inserting a watertight rubber ring 15 between the body 11 and the fixation cap 163 while allowing the lens protection material 161 to be exposed to the outside by covering a circumferential rim of the protection cover 162.

Meanwhile, formed on the front section of the body 11 is a concave rubber ring insertion area 112 that helps the watertight rubber ring 15 to be disposed.

The rear cover 12 is arranged in two-stage disk-shaped patterns for closing the rear of the body 11, in which a disk-shaped contact joining extrusion area 121 is formed on the front of the rear cover 12 for joining closely to an inner diameter of the body 11. And a watertight rubber ring 13 is installed on a circumferential surface of the contact joining extrusion area 121 for joining closely to the rear of the body 11; and a pair of shaft penetration holes 122 is formed at predetermined portions of the contact joining extrusion area 121 for the first and second shafts 43 and 44 to pass through, respectively.

Formed on the inner surface of the shaft penetration hole 122 of the rear cover 12 is a breakaway prevention sill 123 extruded to be contacted closely to small diameter portions on the inner surfaces of the shaft penetration holes 122 so that the small diameter portions of the circumference surfaces of the rear sections of the first and second shafts 43 and 44 inserted into the shaft penetration hole 122 are stuck therein in order not to move away backward.

Reference numeral 14 that is not described denotes a fixation screw to adhere and fix the front cover 16 and the rear cover 12 to the front and rear sections of the body 11, respectively.

The camera unit 2 is comprised of a rectangular camera module 22 disposed in the inner space of the body 11 and whose corners are fixedly supported by four support rods 21 of which rear sections are fixed closely on the front of the rear cover 12, and a lens holder 23 installed on the front of the camera module 22 wherein it is configured to move forward and backward.

The lens assembly 3 is constituted by a focus adjusting unit 31 incorporating a lens therein and installed in the front section of the lens holder 23 for moving forward and backward by its rotational operation, and a distance adjusting unit 32 embedding a lens therein and arranged in the front section of the focal adjusting unit 31 for moving forward and backward by its rotational operation.

To be more specific, the lens assembly 3 is a verifocal lens; and as shown in FIG. 4, one of an ordinary verifocal lens 34 and an auto iris verifocal 35 lens may be applicable selectively, in which FIGS. 1 to 2 of the present invention illustrate the auto iris verifocal lens.

The gear assembly 4 is provided with a focus adjusting gear 41 fixedly installed on the circumference surface of the focus adjusting unit 31, a distance adjusting gear 42 fixedly disposed on the circumference surface of the distance adjusting unit 32, and a first and a second operational gears 45 and 46 of which gear tooth is engaged with corresponding ones of each of the focus adjusting gear 41 and the distance adjusting gear 42.

Specifically, a gear tooth of the focus adjusting gear 41 and the distance adjusting gear 42 is formed in the shape of semi circle ring and of full circle ring, respectively, such that the focus adjusting gear 41 and the distance adjusting gear 42 are fitted to rotational angles rotated at their respective axes.

The first and second shafts 43 and 44 are made in the shape of a long rod whose front sections are joined axially to the first and second operational gears 45 and 46, respectively, and whose rear sections are exposed to the outside through the shaft penetration holes 122 of the rear cover 12 in order to enable their own rotational operations.

Meanwhile, in the first and second shafts 43 and 44, reduced-diameter watertight ring installation portions 47 are formed on adjacent circumferential surfaces of the rear sections inserted into the shaft penetration holes 122 of the rear cover 12; and watertight rings 48 are installed on the circumference surfaces of the watertight ring installation portions 47 to seal any gap between each of the first and second shafts 43 and 44 and each of the shaft penetration holes 122.

Further, in the first and second shafts 43 and 44, the circumference surfaces of the rear sections inserted into the shaft penetration holes 122 of the rear cover 12 are configured to have small-diameter portions in order to prevent the first and second shafts 43 and 44 from moving away towards the rear section of the rear cover 12 by making them stuck in the breakaway prevention sill 123 of the shaft penetration holes 122.

In addition, a support disk 33 is formed in the shape of full circle ring as hollow on the front section of the lens assembly 3 for the assembly itself to pass through in order to support each of the support rods 21 and the front sections of the first and second shafts 43 and 44, wherein multiple holes 331 are arranged on the rim of the support disk 33 for the front sections of the support rods 21 to go through and a pair of support holes 332 is formed for supporting the first and second shafts 43 and 44 whose front sections are inserted thereinto.

In the closed circuit television of the invention as structured above, the multiple support rods 21 which support the camera unit 2 are fixed closely on the front of the contact joining extrusion area 121 of the rear cover 12. And then, the gear assembly 4 is installed in the camera unit 2; and the front sections of the first and second shafts 43 and 44 are joined axially to the first and second operation gears 45 and 46, respectively, out of gear combinations engaged with each other. And under a state where enables a rotational operation of the first and second shafts by exposing their rear sections to the rear of the rear cover 12 through the shaft penetration hole 122 of the rear cover 12, the rear cover 12 is joined to the rear section of the body 11 after installing the watertight rubber ring 13 on the circumference surface of the contact joining extrusion area 121. Lastly, the front cover 16 is joined to the front section of the body 11 after inserting the watertight rubber ring 15 into the rubber ring insertion area 112, so that an assembly process of the closed circuit television of the present invention is completed.

On the other hand, each support rod 21 and the front sections of the first and second shafts 43 and 44 are fixedly supported by the support disk 33 which is disposed at the front section of the camera unit 2 within the body 11.

In the closed circuit television of the present invention assembled so, the camera unit 2 and the lens assembly 3 are installed within the body 11 and then the front cover 16 is joined with the rear cover 12 by inserting the watertight rubber rings 13 and 15 into the front and rear sections of the body 11, respectively, to solidly make the same in airtight state to prevent an infiltration of any contaminant such as a rainwater. Thereafter, the closed circuit television is installed at a desired place; and then when an adjustment of the focal distance and focus of the lens assembly 3 is needed due to a change of a photographing place or a target object while photographing a desired place at a real time, a user causes the gear assembly 4 to operate by a rotational operation of the first and second shafts 43 and 44 which are exposed to the outside through the shaft penetration holes 122 of the rear cover 12. Then, the first and second operation gears 45 and 46 first rotate and in turn the focus adjusting gear 41 and the distance adjusting gear 42 rotate in response to such rotations of the gears 45 and 46. As a result, this makes the focus adjusting unit 31 and the distance adjusting unit 32 of the lens assembly 3 moved forward and backward, thereby adjusting the focal distance and focus for the target object to be photographed.

INDUSTRIAL APPLICABILITY

As described above, the closed circuit television of the present invention allows a focus and a focal distance of a lens located inside a camera body to be adjusted in the outside. By implementing such, the invention can not only solve the inconvenience problem due to the disassembling and reassembling works since it doesn't need to do so but also prevent a possible damage to parts involved in the body during the disassembling and reassembling works. Moreover, the invention can lengthen the life span of the closed circuit television and also keep the good image quality for a long time by preventing the parts like the lens from being corrupted by a contaminant such as a dust owing to a worker's carelessness.

The invention claimed is:

1. A closed circuit television comprising:
   an outer case including a body of hollow shape, a front cover which is detachably connected to a front of the body and a rear cover which is detachably connected to a rear of the body;
   a camera unit including a camera module disposed in an inner space of the body and fixedly supported between multiple support rods whose rear sections are fixed closely to a front of the rear cover, and a lens holder installed on the camera module for moving forward and backward;
   a lens assembly including a focus adjusting unit incorporating a lens and installed in a front section of the lens holder for moving forward and backward by a rotational operation, and a distance adjusting unit incorporating a lens and installed in a front section of the focal adjusting unit for moving forward and backward by a rotational operation;
   a gear assembly including a focus adjusting gear fixedly installed on a circumferential surface of the focus adjusting unit, a distance adjusting gear fixedly installed on a circumferential surface of the distance adjusting unit, and a first and a second operational gears of which gear tooth is engaged with corresponding ones of each of the focus adjusting gear and the distance adjusting gear; and
   a first and a second shafts whose one sections are joined to the first and the second operation gears, respectively, and whose other sections are exposed to the outside through a shaft penetration hole of the rear cover to thereby enable rotational operations of the first and second shafts.

2. The closed circuit television according to claim 1, wherein the front cover comprises:
   a protection cover having a lens protection material disposed at its center; and
   a fixation cap joined to the front of the body by inserting a watertight rubber ring between the body and the fixation cap while making the lens protection material to be exposed to the outside by covering a circumferential rim of the protection cover.

3. The closed circuit television according to claim 1, wherein the rear cover is configured to form a contact joining extrusion area on its front for joining closely to an inner diameter of the body and to join closely to the rear section of the body by inserting a watertight rubber ring between the rear cover itself and the body.

4. The closed circuit television according to claim 3, further comprising a support disk of hollow shape formed on the front section of the lens assembly for the assembly itself to pass through, wherein multiple holes are arranged on the rim of the support disk for the front section of each of the support rods to go through and a pair of support holes is formed for supporting the first and second shafts of which front sections are inserted thereinto, respectively.

5. The closed circuit television according to claim 4, wherein reduced-diameter watertight ring installation sections are formed on circumferential surfaces of the first and second shafts inserted into the shaft penetration holes of the rear cover, a watertight ring being installed on circumferential surfaces of the watertight ring installation sections.

6. The closed circuit television according to claim 5, wherein the circumferential surfaces of the rear sections of the first and second shafts inserted into the shaft penetration holes of the rear cover are configured to have small-diameter portions and breakaway prevention sills extruded to be closed to the small-diameter portions are formed on corresponding inner circumference surfaces of the shaft penetration holes.

7. The closed circuit television according to claim 2, wherein the rear cover is configured to form a contact joining extrusion area on its front for joining closely to an inner diameter of the body and to join closely to the rear section of the body by inserting a watertight rubber ring between the rear cover itself and the body.

\* \* \* \* \*